United States Patent
Yi et al.

(10) Patent No.: US 10,135,513 B2
(45) Date of Patent: Nov. 20, 2018

(54) METHOD AND APPARATUS FOR REPORTING CHANNEL STATE INFORMATION

(71) Applicant: LG ELECTRONICS INC., Seoul (KR)

(72) Inventors: Yunjung Yi, Seoul (KR); Kijun Kim, Seoul (KR); Joonkui Ahn, Seoul (KR); Bonghoe Kim, Seoul (KR); Dongyoun Seo, Seoul (KR); Suckchel Yang, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/107,372

(22) PCT Filed: Dec. 29, 2014

(86) PCT No.: PCT/KR2014/012987
§ 371 (c)(1),
(2) Date: Jun. 22, 2016

(87) PCT Pub. No.: WO2015/099515
PCT Pub. Date: Jul. 2, 2015

(65) Prior Publication Data
US 2016/0337023 A1      Nov. 17, 2016

Related U.S. Application Data

(60) Provisional application No. 61/948,033, filed on Mar. 5, 2014, provisional application No. 61/921,094, filed on Dec. 27, 2013.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0632* (2013.01); *H04L 1/00* (2013.01);
(Continued)

(58) Field of Classification Search
CPC ... H04B 7/0626; H04B 7/0632; H04L 5/0053; H04L 5/0091; H04L 5/0046; H04L 1/00; H04L 27/34; H04L 5/001; H04W 72/0413
See application file for complete search history.

(56) References Cited

U.S. PATENT DOCUMENTS

2009/0163142 A1    6/2009    Pi et al.
2013/0286884 A1    10/2013   Li et al.
(Continued)

FOREIGN PATENT DOCUMENTS

GB          2500254 A       9/2013
WO     WO 2013/123961 A1    8/2013
WO        2013/135475 A1    9/2013

OTHER PUBLICATIONS

Hitachi Ltd., "Further Evaluation and Discussion on 256QAM", R1-134764, 3GPP TSG-RAN WG1 #74b, Guangzhou, China, Oct. 7-11, 2013, 5 pages.
(Continued)

*Primary Examiner* — Kwang B Yao
*Assistant Examiner* — Moo Ryong Jeong
(74) *Attorney, Agent, or Firm* — Birch, Stewart, Kolasch & Birch, LLP

(57) ABSTRACT

The method and the apparatus for reporting CSI are provided. The method comprises receiving reference signal on downlink channel, selecting CQI corresponding to a channel state based on the reference signal and transmitting CSI report comprising the selected CQI, wherein the step of selecting CQI includes selecting CQI index on a CQI table where the CQI index specifies modulation.

6 Claims, 4 Drawing Sheets

(51) Int. Cl.
*H04W 72/04* (2009.01)
*H04L 27/34* (2006.01)
*H04L 1/00* (2006.01)

(52) U.S. Cl.
CPC .......... *H04L 5/0046* (2013.01); *H04L 5/0053* (2013.01); *H04L 5/0091* (2013.01); *H04L 27/34* (2013.01); *H04W 72/0413* (2013.01); *H04L 5/001* (2013.01)

(56) References Cited

U.S. PATENT DOCUMENTS

| | | | | |
|---|---|---|---|---|
| 2014/0192732 | A1* | 7/2014 | Chen | H04L 1/0003 370/329 |
| 2014/0313985 | A1* | 10/2014 | Nimbalker | H04L 27/0012 370/329 |
| 2015/0036590 | A1* | 2/2015 | Lahetkangas | H04L 1/0003 370/328 |
| 2015/0200746 | A1* | 7/2015 | Pan | H04L 1/00 370/329 |
| 2015/0381310 | A1* | 12/2015 | Hammarwall | H04L 1/0003 370/329 |
| 2016/0013918 | A1* | 1/2016 | Zhang | H04L 1/0016 370/329 |

OTHER PUBLICATIONS

ZTE, "Consideration on high order modulation for small cell", R1-130136, 3GPP TSG-RAN WGI Meeting #72, St Julian's, Malta, Jan. 28-Feb. 1, 2013, 6 pages.

ZTE, "Evaluation and standard impact on EVM and receiver impairment for small cell 256QAM", R1-135348, 3GPP TSG RAN WGI Meeting #75, San Francisco, USA, Nov. 11-15, 2013, 7 pages.

* cited by examiner

[Fig. 1]
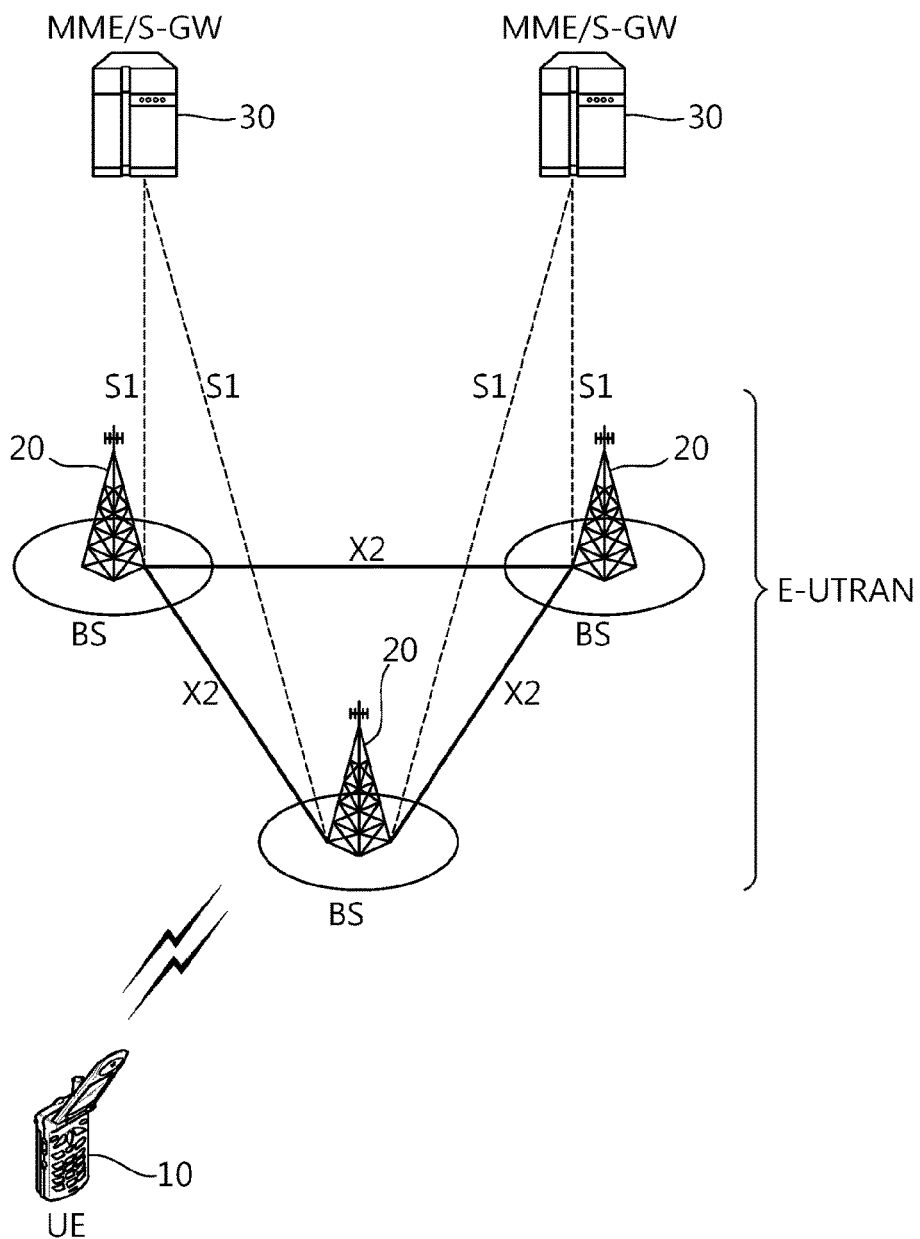

[Fig. 2]
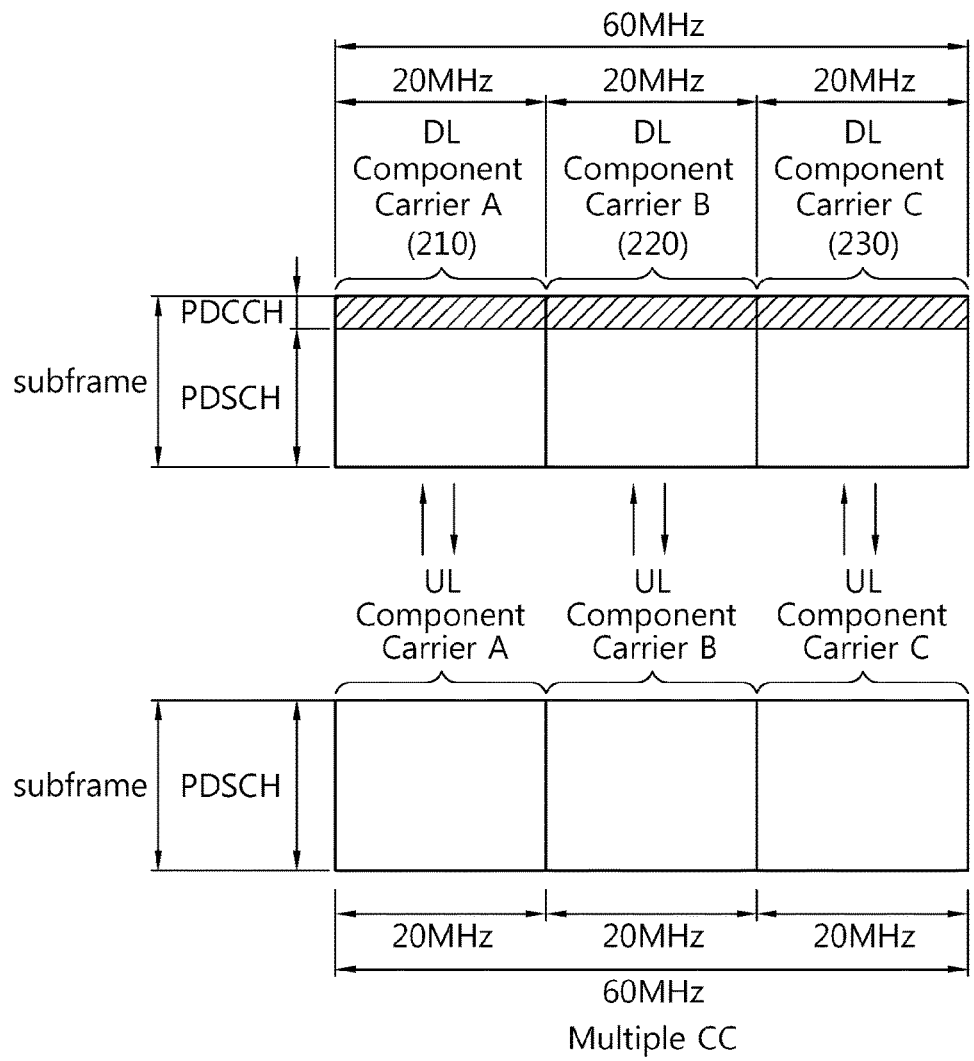
[Fig. 3]
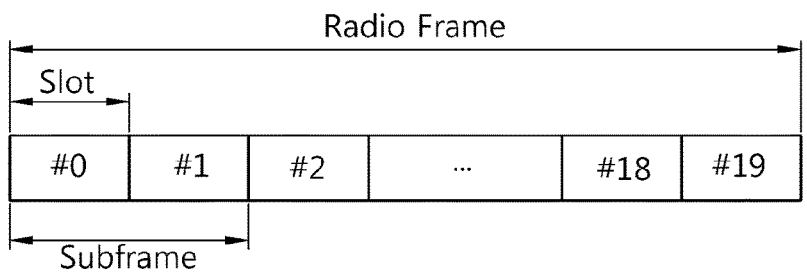

[Fig. 4]
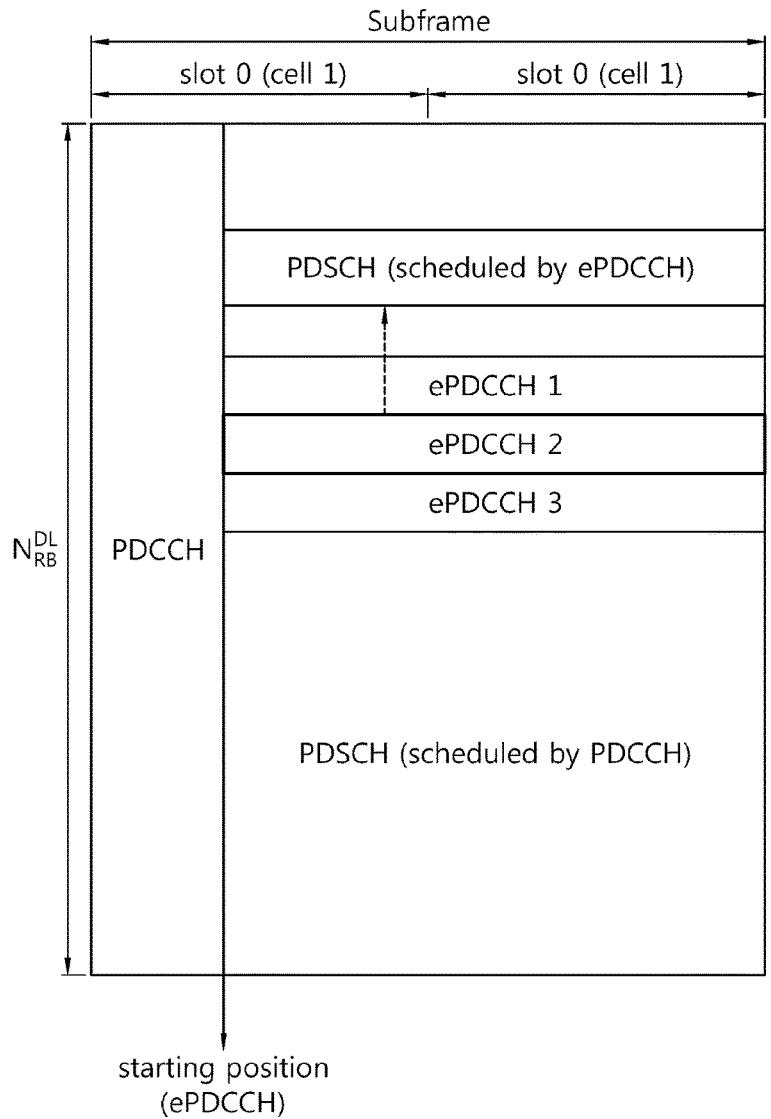
[Fig. 5]
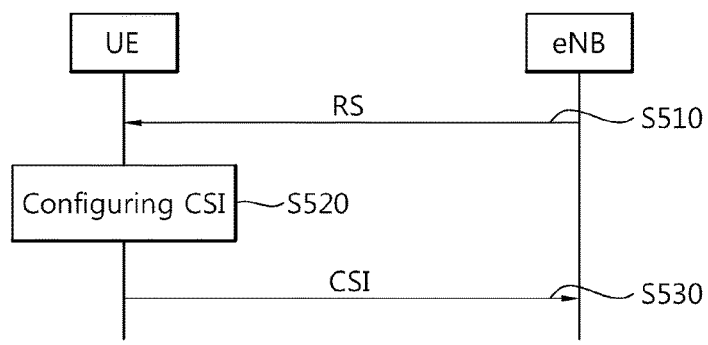

[Fig. 6]
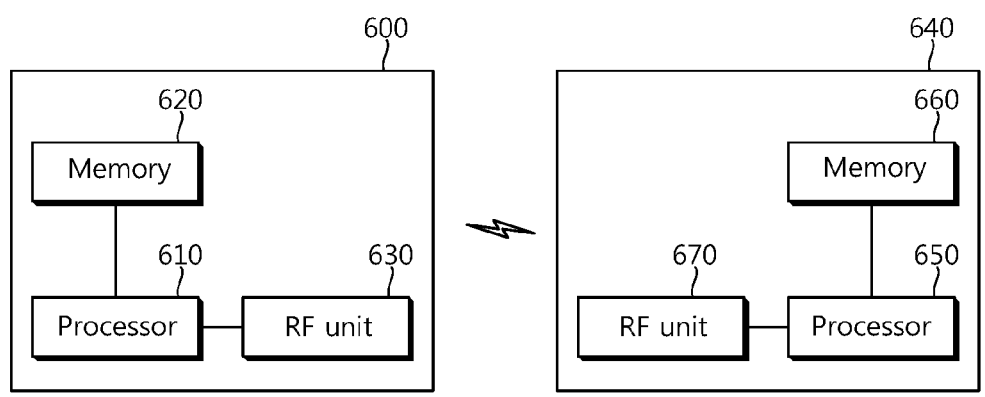

ably performed using 256 QAM.

METHOD AND APPARATUS FOR REPORTING CHANNEL STATE INFORMATION

CROSS REFERENCE TO RELATED APPLICATIONS

This application is the National Phase of PCT International Application No. PCT/KR2014/012987, filed on Dec. 29, 2014, which claims priority under 35 U.S.C. 119(e) to U.S. Provisional Application Nos. 61/921,094, filed on Dec. 27, 2013 and 61/948,033 filed on Mar. 5, 2014, all of which are hereby expressly incorporated by reference into the present application.

TECHNICAL FIELD

This technology is related to wireless communication, more specifically to using modulation of higher order in wireless communication.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

Recently standardization for next generation wireless communication with higher efficiency is in progress.

To handle increasing data traffic, various techniques are being introduced to enhance transmitting capacity. For example, multiple input multiple output (MIMO) using multiple antennas, carrier aggregation (CA) supporting for multiple cells, modulation mode with higher order, etc. are being considered.

However, the newly introduced techniques need to satisfy backward compatibility with legacy apparatuses.

SUMMARY OF INVENTION

Technical Problem

An object of the present invention is to provide method and apparatus for configuring CSI using 256 QAM.

Another object of the present invention is to provide efficient CQI tables to use 256 QAM.

Yet another object of the present invention is to provide a structure of CQI tables and CQI indices to use 256 QAM.

Yet another object of the present invention is to provide method and apparatus for determining CQI tables and selecting CQI index on the selected CQI table.

Solution to Problem

An embodiment of the present invention is a method for reporting channel state information (CSI) including channel quality indicator (CQI) by a user equipment. The method comprises receiving reference signal on downlink channel, configuring CSI comprising CQI selected corresponding to a channel state based on the reference signal and transmitting CSI report on uplink channel, wherein the step of configuring CSI includes selecting CQI index on a CQI table where the CQI index specifies modulation.

Another embodiment of the present invention is an apparatus for reporting CSI including CQI. The apparatus comprises a radio frequency (RF) unit for transmitting and receiving a radio signal and a processor operatively coupled to the RF unit, wherein the processor is configured for transmitting signals via the RF unit based on a scheduling for UL and/or DL, wherein the RF unit receives reference signal on downlink channel, and the processor configures CSI comprising CQI selected corresponding to a channel stat based on the reference signal, and wherein for configuring CSI, the processor selects CQI index on a CQI table where the CQI index specifies modulation.

Advantageous Effects of Invention

According to the present invention, the wireless communication can be efficiently performed using 256 QAM.

According to the present invention, the UE and the eNB transmits and receives CQI with optimized amount of information and in an efficient way in case that they can use 256 QAM.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 is a flow chart for describing an operation of UE and eNB according to the invention(s) in this disclosure.

FIG. 6 is a block diagram which briefly describes a wireless communication system including a UE and a BS (eNB).

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc.

A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. While EPDCCH is transmitted in UE specific search space, PDCCH can be transmitted in common search space as well as in UE specific search space. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

To support downlink scheduling, a UE may provide report on channel state to the eNB. This report can be called as channel state information (CSI). CSI may indicate instantaneous downlink channel quality in both the time and frequency domains. The UE may obtain channel state information by measuring on reference signals transmitted in the downlink.

Based on the CSI, the eNB can perform downlink scheduling i.e. assign resources for downlink transmission to different UEs.

CSI may contain channel quality indicator (CQI), precoding matrix indicator (PMI), rank indicator (RI), etc.

The UE may use downlink reference signal when the UE perform measurement for CSI. The downlink reference signals are predefined signals which occupies specific resource elements in the downlink time-frequency grid. As downlink reference signals, there are cell specific reference signals (CRS), demodulation reference signal (DM-RS), CSI reference signal (CSI-RS), MBSFN reference signals, positioning reference signals, etc.

CRS may be used for channel estimation for coherent demodulation and also can be used for acquiring channel state information. In addition, CSI-RS is specifically intended to be used for obtaining channel state information.

As to CSI-RS, 3GPP TS 36.211 V11.2.0 (2013-02) can be referred.

Multiple CSI reference signal configurations can be used in a given cell. A UE can be configured with multiple sets of CSI reference signals, for example, up to three configurations for which the UE shall assume non-zero transmission power for the CSI-RS and, for another example, zero or more configurations for which the UE shall assume zero transmission power.

The CSI-RS configurations for which the UE shall assume non-zero transmission power are provided by higher layers.

The CSI-RS configurations for which the UE shall assume zero transmission power in a subframe are given by a bitmap. For each bit set to one in the 16-bit bitmap, the UE shall assume zero transmission power for the resource elements corresponding to the four CSI reference signal column in Tables 6.10.5.2-1 and 6.10.5.2-2 of 3GPP TS 36.211 V11.2.0 for normal and extended cyclic prefix, respectively, except for resource elements that overlap with those for which the UE shall assume non-zero transmission power CSI-RS as configured by higher layers. The most significant bit corresponds to the lowest CSI reference signal configuration index and subsequent bits in the bitmap correspond to configurations with indices in increasing order.

CSI reference signals can only occur in downlink slots where $n_s$ mod 2 fulfils the condition in Tables 6.10.5.2-1 and 6.10.5.2-2 of 3GPP TS 36.211 V11.2.0 for normal and extended cyclic prefix, respectively, and where the subframe number fulfils the conditions in Section 6.10.5.3 3GPP TS 36.211 V11.2.0.

The UE may assume that CSI reference signals are not transmitted in the special subframe(s) in case of frame structure type 2, in subframes where transmission of a CSI-RS would collide with transmission of synchronization signals, PBCH, or System-InformationBlockType1 messages, and in the primary cell in subframes configured for transmission of paging messages in the primary cell for any UE with the cell-specific paging configuration.

The time and frequency resources that can be used by the UE to report CSI which consists of channel quality indicator (CQI), precoding matrix indicator (PMI), precoding type indicator (PTI), and/or rank indication (RI) are controlled by the eNB. For spatial multiplexing, the UE may determine a RI corresponding to the number of useful transmission layers.

A UE in transmission mode 8 or 9 is configured with or without PMI/RI reporting by the higher layer parameter pmi-R-Report.

A UE in transmission mode 10 can be configured with one or more CSI processes per serving cell by higher layers. Each CSI process is associated with a CSI-RS resource (defined in Section 7.2.5 of 3GPP TS 36.211 V11.2.0) and a CSI-interference measurement (CSI-IM) resource (defined in Section 7.2.6 of 3GPP TS 36.211 V11.2.0). A CSI reported by the UE corresponds to a CSI process configured by higher layers. Each CSI process can be configured with or without PMI/RI reporting by higher layer signalling.

A UE is configured with resource-restricted CSI measurements if the subframe sets $C_{CSI,0}$ and $C_{CSI,1}$ are configured by higher layers.

CSI reporting is periodic or aperiodic.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

For serving cell c, a UE configured in transmission mode 10 with PMI/RI reporting for a CSI process can be configured with a 'RI-reference CSI process'. If the UE is configured with a 'RI-reference CSI process' for the CSI process, the reported RI for the CSI process shall be the same as the reported RI for the configured 'RI-reference CSI process'. The UE is not expected to receive an aperiodic CSI report request for a given subframe triggering a CSI report including CSI associated with the CSI process and not including CSI associated with the configured 'RI-reference CSI process'.

For a UE in transmission mode 10, in case of collision between CSI reports of same serving cell with PUCCH reporting type of the same priority, and the CSI reports corresponding to different CSI processes, the CSI reports corresponding to all CSI processes except the CSI process with the lowest CSIProcessIndex are dropped.

If the UE is configured with more than one serving cell, the UE transmits a CSI report of only one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

For a given subframe and UE in transmission mode 1-9, in case of collision between CSI reports of different serving cells with PUCCH reporting type of the same priority, the CSI of the serving cell with lowest ServCellIndex is reported, and CSI of all other serving cells are dropped.

For a given subframe and UE in transmission mode 10, in case of collision between CSI reports of different serving cells with PUCCH reporting type of the same priority and the CSI reports corresponding to CSI processes with same CSIProcessIndex, the CSI reports of all serving cells except the serving cell with lowest ServCellIndex are dropped.

For a given subframe and UE in transmission mode 10, in case of collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex are dropped.

As described above, CSI report may contain CQI.

The CQI indices and their interpretations are given in Table 1. Table 1 is a table for 4-bit CQI.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an unrestricted observation interval in time and frequency, the UE shall derive for each CQI value reported in uplink subframe n the highest CQI index between 1 and 15 in Table 1 which satisfies the following condition, or CQI index 0 if CQI index 1 does not satisfy the condition: A single PDSCH transport block with a combination of modulation scheme and transport block size corresponding to the CQI index, and occupying a group of downlink physical resource blocks termed the CSI reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers, the UE shall derive the channel measurements for computing the CQI value reported in uplink subframe n based on only the Channel-State Information (CSI) reference signals (CSI-RS) defined in 3GPP TS 36.211 V11.2.0 for which the UE is configured to assume non-zero power for the CSI-RS. For a UE in transmission mode 9 when the parameter pmi-R-Report is not configured by higher layers or in other transmission modes the UE shall derive the channel measurements for computing CQI based on CRS.

For a UE in transmission mode 10, the UE shall derive the channel measurements for computing the CQI value reported in uplink subframe n and corresponding to a CSI process, based on only the non-zero power CSI-RS within a configured CSI-RS resource associated with the CSI process.

For a UE in transmission mode 10, the UE shall derive the interference measurements for computing the CQI value reported in uplink subframe n and corresponding to a CSI process, based on only the zero power CSI-RS within the configured CSI-IM resource associated with the CSI process. If the UE in transmission mode 10 is configured by higher layers for CSI subframe sets $C_{CSI,0}$ and $C_{CSI,1}$, the configured CSI-IM resource within the subframe subset belonging to the CSI reference resource is used to derive the interference measurement.

A combination of modulation scheme and transport block size corresponds to a CQI index if: the combination could be signalled for transmission on the PDSCH in the CSI reference resource according to the relevant Transport Block Size table, and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource for a serving cell is defined as follows: In the frequency domain, the CSI reference resource is defined by the group of downlink physical resource blocks corresponding to the band to which the derived CQI value relates. In the time domain, (1) for a UE configured in transmission mode 1-9 or transmission mode 10 with a single configured CSI process for the serving cell, the CSI reference resource is defined by a single downlink subframe $n-n_{CQI\_ref}$, where for periodic CSI reporting $n_{CQI\_ref}$ is the smallest value greater than or equal to 4, such that it corresponds to a valid downlink subframe; where for aperiodic CSI reporting $n_{CQI\_ref}$ is such that the reference resource is in the same valid downlink subframe as the corresponding CSI request in an uplink DCI format; where for aperiodic CSI reporting $n_{CQI\_ref}$ is equal to 4 and downlink subframe $n-n_{CQI\_ref}$ of corresponds to a valid downlink subframe, where downlink subframe $n-n_{CQI\_ref}$ is received after the subframe with the corresponding CSI request in a Random Access Response Grant, (2) for a UE configured in transmission mode 10 with multiple configured CSI processes for the serving cell, the CSI reference resource for a given CSI process is defined by a single downlink subframe $n-n_{CQI\_ref}$, where for FDD and periodic or aperiodic CSI reporting $n_{CQI\_ref}$ is the smallest value greater than or equal to 5, such that it corresponds to a valid downlink subframe; where for FDD and aperiodic CSI reporting $n_{CQI\_ref}$ is equal to 5 and downlink subframe $n-n_{CQI\_ref}$ corresponds to a valid downlink subframe, where downlink subframe $n-n_{CQI\_ref}$ is received after the subframe with the corresponding CSI request in a Random Access Response Grant.

A downlink subframe in a serving cell shall be considered to be valid if: it is configured as a downlink subframe for that UE, and except for transmission mode 9 or 10, it is not an MBSFN subframe, and it does not contain a DwPTS field in case the length of DwPTS is $7680 \cdot T_s$, and less, and it does not fall within a configured measurement gap for that UE, and for periodic CSI reporting, it is an element of the CSI subframe set linked to the periodic CSI report when that UE is configured with CSI subframe sets.

If there is no valid downlink subframe for the CSI reference resource in a serving cell, CSI reporting is omitted for the serving cell in uplink subframe n.

In the layer domain, the CSI reference resource is defined by any RI and PMI on which the CQI is conditioned.

In the CSI reference resource, the UE shall assume the following for the purpose of deriving the CQI index, and if also configured, PMI and RI:

(i) The first 3 OFDM symbols are occupied by control signaling.

(ii) No resource elements used by primary or secondary synchronisation signals or PBCH.

(iii) CP length of the non-MBSFN subframes (iv) Redundancy Version 0

(v) If CSI-RS is used for channel measurements, the ratio of PDSCH EPRE to CSI-RS EPRE is as given in Section 7.2.5 of 3GPP TS 36.211 V11.2.0

(vi) For transmission mode 9 CSI reporting: ① CRS REs are as in non-MBSFN subframes. ② If the UE is configured for PMI/RI reporting, the UE-specific reference signal overhead is consistent with the most recent reported rank; and PDSCH signals on antenna ports {7 . . . 6+v} for v layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\nu-1)}(i) \end{bmatrix},$$

where $x(i)=[x^{(0)}(i) \ldots x^{(\nu-1)}(i)]^T$ is a vector of symbols from the layer mapping in section 6.3.3.2 of 3GPP TS 36.211 V11.2.0, $P \in \{1, 2, 4, 8\}$ is the number of CSI-RS ports configured, and if only one CSI-RS port is configured, W(i) is 1 and the UE-specific reference signal overhead is 12 REs; if more than one CSI-RS ports are configured, W(i) is the precoding matrix corresponding to the reported PMI applicable to x(i). The corresponding PDSCH signals transmitted on antenna ports {15 . . . 14+P} would have a ratio of EPRE to CSI-RS EPRE equal to the ratio given in section 7.2.5 of 3GPP TS 36.211 V11.2.0.

For transmission mode 10 CSI reporting, if a CSI process is configured without PMI/RI reporting: (1) If the number of antenna ports of the associated CSI-RS resource is one, a PDSCH transmission is on single-antenna port, port 7. The channel on antenna port {7} is inferred from the channel on antenna port {15} of the associated CSI-RS resource. ① CRS REs are as in non-MBSFN subframes. ② The UE-specific reference signal overhead is 12 REs per PRB pair. (2) Otherwise, ① If the number of antenna ports of the associated CSI-RS resource is 2, the PDSCH transmission scheme assumes the transmit diversity scheme defined in section 7.1.2 on antenna ports {0,1} except that the channels on antenna ports {0,1} are inferred from the channels on antenna port {15, 16} of the associated CSI resource respectively. ② If the number of antenna ports of the associated CSI-RS resource is 4, the PDSCH transmission scheme assumes the transmit diversity scheme defined in section 7.1.2 on antenna ports {0, 1, 2, 3} except that the channels on antenna ports {0, 1, 2, 3} are inferred from the channels on antenna ports {15, 16, 17, 18} of the associated CSI-RS resource respectively. ③ The UE is not expected to be configured with more than 4 antenna ports for the CSI-RS resource associated with the CSI process configured without PMI/RI reporting. ④ The overhead of CRS REs is assuming the same number of antenna ports as that of the associated CSI-RS resource. ⑤ UE-specific reference signal overhead is zero.

For transmission mode 10 CSI reporting, if a CSI process is configured with PMI/RI reporting: (1) CRS REs are as in non-MBSFN subframes. (2) The UE-specific reference signal overhead is consistent with the most recent reported rank; and PDSCH signals on antenna ports {7 . . . 6+v} for v layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in section 6.3.3.2 of 3GPP TS 36.211 V11.2.0, $P \in \{1, 2, 4, 8\}$ is the number of antenna ports of the associated CSI-RS resource, and if P=1, W(i) is 1 and the UE-specific reference signal overhead is 12REs; if P>1, W(i) is the precoding matrix corresponding to the reported PMI applicable to x(i). The corresponding PDSCH signals transmitted on antenna ports {15 . . . 14+P} would have a ratio of EPRE to CSI-RS EPRE equal to the ratio given in section 7.2.5 of 3GPP TS 36.211 V11.2.0.

It is assumed that no REs is allocated for CSI-RS and zero-power CSI-RS and no REs is allocated for PRS.

The PDSCH transmission scheme given by Table 2 depending on the transmission mode currently configured for the UE (which may be the default mode).

TABLE 2

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port 7; otherwise transmit diversity<br>If a CSI process of the UE is configured with PMI/RI reporting: if the number of CSI-RS ports is one, single-antenna port, port 7; otherwise up to 8 layer transmission, ports 7-14 (see subclause 7.1.5B) |

If CRS is used for channel measurements, the ratio of PDSCH EPRE to cell-specific RS EPRE is as given in Section 5.2 of 3GPP TS 36.211 V11.2.0 with the exception of $\rho_A$ which shall be assumed to be (i) $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one; (ii) $\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

Meanwhile, in LTE-Advanced, to improve spectral efficiency, higher order modulation such as 256 QAM is considered. Up to LTE Rel-11, only QPSK, 16 QAM and 64 QAM were supported. Thus, necessary changes needs to support higher order modulation such as 256 QAM.

In this disclosure, it is more specifically described how to perform CQI feedback when a UE supports 256 QAM where CQI table for 256 QAM may be different from the legacy table which support only QPSK, 16 QAM and 64 QAM.

More specifically, an example of two different tables as below is described. Table 3 is 4 bit CQI table for legacy i.e. non-256 QAM enabled and Table 4 is 4 bit CQI table for 256 QAM.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 4

| CQI index | modulation | code rate × 1024 | efficiency |
|---|---|---|---|
| 0 | | out of range | |
| 1 | QPSK | 78 | 0.1523 |
| 2 | QPSK | 449 | 0.8770 |
| 3 | QPSK | 602 | 1.1758 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 64QAM | 948 | 5.5547 |
| 13 | 256QAM | xxx | x.xxxx |
| 14 | 256QAM | xxx | x.xxxx |
| 15 | 256QAM | xxx | x.xxxx |

Since the operating signal-to-interference-and-noise ratio (SINR) range for each modulation is different, depending on operating SINR range of a UE, it may be better to use legacy table or 256 QAM table. As operating SINR range can change dynamically, a mechanism to switch between two tables for CQI optimization can be considered.

Firstly, a mechanism to semi-statically change the table can be considered. In terms of configuration, the following options (I)~(III) can be considered.

(I) CQI table is determined when modulation and coding scheme (MCS) table is configured. For example, a UE is configured (implicitly) to use 256 QAM CQI table when a UE is configured to use 256 QAM MCS table for its modulation and transport block size (TBS) calculation. Using this option, CQI table which can fall back to legacy table could be used only when MCS table is changed to legacy table from 256 QAM table. In other words, downlink modulation configuration will determine feedback table implicitly.

(II) CQI table is determined independently on the MCS table. In this case, either a separate configuration or indication to which table used for 256 QAM can be given to a UE independently from the MCS table. Regardless of actual usage of 256 QAM in downlink, uplink feedback can be configured separately to use a table for the feedback. This option may be to configure different table per measurement subframe set or per subframe set or per ICIC subframe set.

(III) Hybrid of (I) and (II) can be considered as well where a UE may assume to use 256 QAM table unless it is configured to use another table when downlink 256 QAM is configured. Or, the opposite configuration (by default, a UE uses legacy table unless explicit configuration to use 256 QAM table is configured) is also feasible. For example, in this case, regardless of CQI table configuration, whether to use 256 QAM MCS/TBS table or not may be dependent on subframe or DCI format or other dynamic signaling. For example, DCI 1A uses legacy table whereas other DCI formats can use 256 QAM enabled MCS/TBS table.

Besides when uplink 256 QAM is supported, the above options to determine which table for CSI feedback can be applied to determining whether to use 256 QAM uplink transmission as well. In other words, either uplink 256 QAM implicitly determined when downlink 256 QAM is configured, or a separate enabling configuration can be considered. For uplink 256 QAM configuration, different configuration per subframe set or per dynamic signaling (depending on MCS) can be further considered.

When table can be changed via higher-layer signaling such as RRC, it is necessary to consider RRC ambiguity issue. Initially, when a UE is configured with periodic CSI reporting, aperiodic CSI reporting, it is reasonable to assume that the indication of table is included in the configuration of measurement reporting.

Similar to other parameters for CSI feedback, one option to change CQI table is to reconfigure measurement parameters via RRC connection reconfiguration messages. Since depending on the table, CQI values are different, it could be also considered to change the PUCCH resource for CSI feedback and then by decoding the PUCCH resource and payload, eNB may be able to determine which table the UE has used for CQI feedback.

A separate parameter also can be considered such as "256QAMCqiTableUsed" where if this is true, 256 QAM table is used and if this is not true, legacy table is used. When reconfiguration of this parameter is occurred, indication or configuration of an explicit PUCCH resource can be also considered. For example, $n_{PUCCH}$ for PUCCH format 2 can be additionally configured (may be separate for each p).

Another example of avoiding RRC ambiguity issue is to assign additional "PUCCH" resource which will be used only in RRC reconfiguration period for PUCCH format 2, 1a, 3 all together potentially regardless of acknowledgement resource indicator (ARI) or application resource optimizer (ARO).

In RRC reconfiguration period, PUCCH may be transmitted or only CQI feedback will be transmitted in that additional resource to eliminate the ambiguity.

Another possibility is to report both CQI values via TDM or FDM approach. If TDM is used, for example, CQI report based on each table can be reported in a round robin manner per each CQI reporting instance. If FDM is used, for example, additional resource (+1 from the original configuration) can be used to transmit the second CQI.

Yet Another possibility is to create the table such that two tables have common entries. For example, from two tables, the entries of 0-1, 5-15 are reserved as the same where 2-4 will be used for QPSK in legacy table and for 256 QAM in 256 QAM table. In RRC reconfiguration period, UE selects CQI only from 0-1, and 5-15 such that there is no ambiguity in the network side. Or, the network may assume common entries of CQI reports are valid and reports on non-common entries may be dropped or ignored. If this is used, if 256 QAM is used, it may not be true that higher CQI value means better channel condition as CQI entries for 256 QAM uses the low indices such as 2-4.

Another option to handle RRC ambiguity is to ignore any CSI feedback reported during RRC reconfiguration (in other words, it does not matter which table the UE is using). In this case, to save UE energy, a UE may drop CQI feedback during the RRC reconfiguration period. Or, a UE may be configured with the behaviour whether to drop CQI feedback during RRC reconfiguration or not.

When CQI table design to consider RRC configuration is formulated such that CQI index may not increase with spectral efficiency, we discuss further how to report differential CQI.

Table 5 is another 4 bit CQI table for 256 QAM. In table 5, CQI index may not increase with spectral efficiency.

TABLE 5

| CQI index | modulation | code rate × 1024 | efficiency | CQI index for differential CQI |
|---|---|---|---|---|
| 0 | | out of range | | 0 |
| 1 | QPSK | 78 | 0.1523 | 1 |
| 2 | 256QAM | xxx | x.xxxx | 16 |
| 3 | QPSK | 193 | 0.3770 | 3 |
| 4 | 256QAM | xxx | x.xxxx | 17 |
| 5 | QPSK | 449 | 0.8770 | 5 |
| 6 | 256QAM | xxx | x.xxxx | 18 |
| 7 | 16QAM | 378 | 1.4766 | 7 |
| 8 | 16QAM | 490 | 1.9141 | 8 |
| 9 | 16QAM | 616 | 2.4063 | 9 |
| 10 | 64QAM | 466 | 2.7305 | 10 |
| 11 | 64QAM | 567 | 3.3223 | 11 |
| 12 | 64QAM | 666 | 3.9023 | 12 |
| 13 | 64QAM | 772 | 4.5234 | 13 |
| 14 | 64QAM | 873 | 5.1152 | 14 |
| 15 | 64QAM | 948 | 5.5547 | 15 |

In this case, we can have a mother CQI table for differential CQI. Table 6 is a mother CQI table.

TABLE 6

| CQI index for differential CQI | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| 16 | 256QAM | xxx | x.xxxx |
| 17 | 256QAM | xxx | x.xxxx |
| 18 | 256QAM | xxx | x.xxxx |

The mother CQI table includes both legacy table and 256 QAM table as following where differential CQI is mapped to CQI value from the mother table.

For example, if wideband CQI reporting reports CQI=3, then the CQI value would be determined CQI index from mother table+offset level, e.g., offset level=1 means CQI=4 which maps to spectral efficiency of 0.6016.

In RRC reconfiguration period, if wideband CQI value would be 2, 4, 6 (for example) which are used for 256 QAM, differential CQI values could be ambiguous, and thus, values for those entries may not be used in RRC ambiguity period. That is, the table used for wideband CQI and sub-band CQI may be different where the common entries/behaviors are preserved regardless of RRC reconfiguration.

In other words, a mother table containing both legacy entries and 256 QAM entries can be specified where a table used as wideband CQI table can be configured.

This approach offers some benefits as follows. (a) Since differential CQI can address all CQI entries, those entries can be used for determining proper MCS levels, especially for cell-common data and data scheduled via CSS which may not use 256 QAM MCS entries. (b) It offers an easy RRC reconfiguration as RRC ambiguity issue would not be significant. (c) it offers to utilize DCI 1A for compact DCI with 256 QAM; Yet, to support all the VoIP packet size with flexible data rate and number of RB allocation, it would be desirable to support DCI 1A via Common search space (CSS) with legacy table (also DCI 1A with UE-specific search space (USS) can be based on legacy table for this matter as well).

On the other hand, even though this approach may mitigate the RRC ambiguity issue, still, some entries are not usable at RRC reconfiguration where VoIP traffic may be affected as DCI 1A with those MCS entries are not schedulable in RRC reconfiguration via USS.

As CSS offers only high aggregation levels (AL) (4/8), it may not be so efficient operation if RRC reconfiguration is frequent. Thus, regardless of this approach, using legacy table with DCI 1A should still be considered depending on the frequency of DCI 1A scheduling and full supportability on VoIP data rates. Also, this approach requires UE to perform CQI calculation using two different tables and adds burden on eNB to infer differential CQI values.

Even though a new table for differential CQI, as an example described in this disclosure, is designed assuming CQI table for wideband has "out-of-order" CQI indices not aligned with spectral efficiency, the new table approach for differential CQI can be applied regardless of CQI table used for wideband.

For example, wideband CQI table is formulated similar to, the differential CQI table can be formulated such as where differential CQI is calculated using the differential CQI table where the mapping between wideband CQI and the reference CQI index in differential CQI table is as Table 7.

TABLE 7

| CQI index for differential CQI | modulation | code rate × 1024 | efficiency | Wideband CQI index |
|---|---|---|---|---|
| 0 | | out of range | | 0 |
| 1 | QPSK | 78 | 0.1523 | 1 |
| 2 | QPSK | 120 | 0.2344 | |
| 3 | QPSK | 193 | 0.3770 | 2 |
| 4 | QPSK | 308 | 0.6016 | |
| 5 | QPSK | 449 | 0.8770 | 3 |
| 6 | QPSK | 602 | 1.1758 | |
| 7 | 16QAM | 378 | 1.4766 | 4 |
| 8 | 16QAM | 490 | 1.9141 | 5 |
| 9 | 16QAM | 616 | 2.4063 | 6 |
| 10 | 64QAM | 466 | 2.7305 | 7 |
| 11 | 64QAM | 567 | 3.3223 | 8 |
| 12 | 64QAM | 666 | 3.9023 | 9 |
| 13 | 64QAM | 772 | 4.5234 | 10 |
| 14 | 64QAM | 873 | 5.1152 | 11 |
| 15 | 64QAM | 948 | 5.5547 | 12 |
| 16 | 256QAM | xxx | x.xxxx | 13 |
| 17 | 256QAM | xxx | x.xxxx | 14 |
| 18 | 256QAM | xxx | x.xxxx | 15 |

For example, referring to Table 7, if wideband CQI is reported as 2, then the differential CQI value of −1 would be mapped to spectral efficiency of "0.2344" which is CQI index 2 in differential CQI table.

In principle, two tables for wideband CQI and differential CQI can be different. Thus, wideband CQI may not be able to refer all the spectral efficiency values however differential CQI can refer to those entries removed from wideband CQI table when 256 QAM is configured.

Alternatively, a table can be considered which includes entries covering spectral efficiency from xx % to yy % with equal steps (or potentially different for 256 QAM entries where the same step size is used among 256 QAM entries), then a table used for wideband CQI reporting can be higher layer configured or predetermined.

In terms of reporting wide-band CQI, the index values can be chosen from the selected indices only whereas the differential CQI and other measurement can use the table with all the entries. In this case, depending on UE SINR condition, which entries will be used can be higher-layer configured.

Next, the table change can be done via Medium Access Control (MAC) control element (CE). To potentially reduce the RRC ambiguity period and make the fast transition between tables, MAC control element based (similar to SCell activation/deactivation) approach can be also considered. If this is used, the effective timing of the new table configured via MAC CE follows the same timing of MAC CE for SCell activation (i.e., n+8). If CQI occurs before n+8 when MAC CE has been received at subframe n, it uses the previous CQI table, or it may drop CQI. Simply, the network may ignore any CQI feedback reported before A/N is received for MAC CE command once table change command is triggered via MAC CE.

Finally, the table change can be done via physical layer signalling such as DCI such as aperiodic CSI request or NDI or new DCI or etc. Another possible approach is to dynamically change the table via DCI indication.

For example, if aperiodic CSI request can include the indication of which table to be used for a given CC, once aperiodic CSI request is triggered, the UE may assume that the table is switched to the table indicated by the aperiodic request. Another example would be that CSI request can be triggered with zero resource allocation, then it may be assumed as a command to change the table (i.e., toggle between two table. In other words, if the UE has used 256 QAM table, it changes to legacy table and vice versa). Or, downlink DCI can be also used to trigger table switch (such as DCI 1A with zero resource allocation similar to SPS activation DCI).

To determine which table is more suitable, occasionally, the network may request CQI values on both tables. One approach is to transmit CQI calculated from both tables by aperiodic CSI feedback when aperiodic CSI request is triggered for a UE which is configured to use 256 QAM. Instead of transmitting one CQI per CSI process for a component carrier (CC), if a UE is configured with 256 QAM, it will report CQI values calculated based on both tables (256 QAM and legacy CQI tables). Based on CQI feedback, the network may be able to determine which table is more appropriate and then reconfigure the table.

So far, we have looked at different approaches of changing tables between legacy and 256 QAM CQI tables. Given that operating SINR range may change dynamically and also the change can occur any time, table change could occur frequently. Accordingly, reconfiguration may not be desirable.

Thus, we consider cases where reconfiguration is not assumed. In this case, some special handlings would be necessary to address the diverse range of SINR. One example is to configure two CSI process for the same CC even without CoMP configured where one CSI report is based on legacy CQI table whereas the other is based on 256 QAM table. In this case, PMI-RI may not be configured for the second CSI process separately as PMI and RI values could be the same.

In other words, regardless of PMI-RI configuration of the first CSI, the second CSI process may not report any PMI or RI. It will report only CQI following the period configured for the CSI process.

A separate CSI configuration can be given to the second CSI process. If the currently configured table is appropriate (i.e., operating SINR range is good for the configured table), then the second CSI may not be necessary to be reported. In that case, CQI feedback will be reported only for the second CSI process period. In other words, when two CSI processes are configured, PMI and RI are reported following the first CSI process configuration.

For CQI report, it may be selected based on the condition of SINR. The UE may report only one CQI based on the proper CQI table based on UE measurement. For example, a UE experiences relatively low SINR, it may use the legacy CQI table and report the CQI in the resource configured for the second CSI process (if legacy CQI table is configured for the second CSI process) and it may not transmit CQI at the resources/subframes configured for the first CSI process (since 256 QAM table is configured for the second process).

For the second CSI process, it may be assumed that other parameters are the same to the first CSI process unless it is configured otherwise. The network may detect the correct value by receiving CQI report and also the resource location.

Another approach is to use CSI measurement sets where each set is associated with one table. Drawbacks of these approaches would be that it would not be easy to combine with CoMP operation or ICIC techniques.

Yet another approach is to define a new reporting type which can use 256 QAM table where CQI with current reporting type is calculated based on legacy table whereas new reporting type reports wideband CQI (or subband CQI as well) based on 256 QAM table. Or, a higher layer configuration to use which table for each reporting type can also be considered.

Lastly, if 256 QAM table is configured mainly for subband, wide-band CQI can be reported using legacy table whereas differential CQI can be reported using the 256 QAM enabled where the differential CQI can be mapped in a 256 QAM enabled table.

For example, if is used for wideband CQI reporting where is used for differential CQI computation, if CQI index=3 (mapped to spectral efficiency of 0.3770) is reported with differential CQI=−1 which corresponds to CQI index=2 in (mapped to spectral efficiency of 0.8770). In this case, spectral efficiency has been increased.

This approach has some drawbacks and advantages. Some CQI entries (particularly in low SINR) may not be addressable by differential CQI reporting due to the limited offset values which may be more important in differential CQI feedbacks whereas higher SINR (256 QAM operating SINR range) can have benefits from this approach.

FIG. 5 is a flow chart for describing an operation of UE and eNB according to the invention(s) in this disclosure.

Referring to FIG. 5, the eNB may transmit reference signals and the UE may receive reference signals on the downlink channels (S510).

The UE may configure CSI based on the received reference signals (S520). The UE may perform a measurement for channel state with the reference signals. The UE may select CQI index on a CQI table according to the channel state. The CQI index may specify modulation scheme, code rate, efficiency, etc. on the CQI table.

The UE and the eNB may use two CQI tables to use 256 QAM according to the invention(s) of this disclosure. For example, CQI table for legacy CQI and CQI table for using 256 QAM can be used.

The CQI table for legacy CQI may map CQI index into one of QPSK, 16 QAM, and 64 QAM and the CQI table for using 256 QAM may map CQI index into one of QPSK, 16 QAM, 64 QAM and 256 QAM. The eNB may transmit signals for indicating which CQI table is used. The signal may be transmitted by a RRC signalling or by DCI. Or the CQI to be used can be determined by MAC CE.

In addition, the UE and the eNB may also use a legacy CQI table and mother CQI table. The mother CQI table may be configured with entries of legacy CQI table and entries for 256 QAM. Thus, the legacy CQI table may be configured with 4 bits and the mother CQI table may be configured with more than 4 bits, for example 5 bits, etc. The mother CQI table, the legacy table and their CQI indices are described in detail above.

The UE may report CSI including CQI on the uplink channel (S530). The eNB may specify the downlink channel state with the received CSI and may decide modulation scheme according to the CSI. The eNB may specify downlink channel quality using CQI index in the CSI. The eNB may use same CQI table which the UE used.

FIG. 6 is a block diagram which briefly describes a wireless communication system including a UE 600 and a BS (eNB) 640. The UE 600 and the BS 640 may operate based on the described as before.

In view of downlink, a transmitter may be a part of the BS 640 and a receiver may be a part of the UE 600. In view of uplink, a transmitter may be a part of the UE 600 and a receiver may be a part of the BS 640.

Referring to FIG. 6, the UE 600 may include a processor 610, a memory 620, and a radio frequency (RF) unit 630.

The processor 610 may be configured to implement proposed procedures and/or method described in this disclosure. For example, the processor 610 may configure CSI comprising CQI index using reference signals.

The processor 610 may perform measurement on channel state based on the reference signal and may select CQI index corresponding measured channel state on the CQI table. The processor 610 may use two CQI tables. For example, the processor 610 can use CQI table for legacy CQI and CQI table for using 256 QAM. The CQI table for legacy CQI may map CQI index into one of QPSK, 16 QAM, and 64 QAM and the CQI table for using 256 QAM may map CQI index into one of QPSK, 16 QAM, 64 QAM and 256 QAM. Which table to be used is signalled or determined using predetermined method.

For another example, the processor 610 can also use a legacy CQI table and mother CQI table. The mother CQI table may be configured with entries of legacy CQI table and entries for 256 QAM. Thus, the legacy CQI table may be configured with 4 bits and the mother CQI table may be configured with more than 4 bits, for example 5 bits, etc.

The CQI tables, CQI indices and method to choose CQI table to be used are same as described as before.

The memory 620 is coupled with the processor 610 and stores a variety of information to operate the processor 610 such as CQI tables. The RF unit 630 may also coupled with the processor 610. The RF unit 630 may receive reference signal and transmit CSI.

The BS 640 may include processor 650, a memory 660, and a RF unit 670. Here, the BS 640 may be PCell or SCell and the BS 640 may be a macro cell or small cell. In addition the BS may be a source cell for network synchronization or a target cell for network synchronization.

The processor 650 may be configured to implement proposed procedure and/or method described in this disclosure. For example, the processor 650 may transmit reference signal on downlink channel. The processor 650 may specify the downlink channel state with the received CSI and may decide modulation scheme according to the CSI. The processor 650 may specify downlink channel quality using CQI index in the CSI. Here, the processor 650 may use same CQI table used in the UE 600.

The CQI tables, CQI indices and method to choose CQI table to be used are same as described as before.

The memory 660 is coupled with the processor 650 and stores a variety of information to operate the processor 650 such as CQI tables. The RF unit 670 may also coupled with the processor 650. The RF unit 670 may transmit reference signal and receive CSI.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for reporting channel state information (CSI) including channel quality indicator (CQI) by a user equipment, the method comprising:
   receiving a reference signal on a downlink channel from an evolved NodeB (eNB);
   receiving an indication to use a first CQI table from the eNB;
   configuring first CSI comprising a first CQI index, which is selected on the first CQI table corresponding to a channel state based on the reference signal;
   transmitting the first CSI comprising the first CQI index by using a first physical uplink control channel (PUCCH) resource to the eNB;
   receiving an indication to use a second CQI table via a radio resource control (RRC) connection reconfiguration message from the eNB;
   receiving a configuration indicating whether to transmit or drop CSI during an RRC reconfiguration period which is initiated by receiving the RRC connection reconfiguration message from the eNB;
   when the configuration indicates to transmit CSI during the RRC reconfiguration period,
   during the RRC reconfiguration period:
      configuring second CSI comprising a second CQI index, which is only selected from common entries of the first CQI table and the second CQI table; and
      transmitting the second CSI comprising the second CQI index by using a second PUCCH resource to the eNB, wherein the second PUCCH resource is an additional different PUCCH resource than the first PUCCH resource and is used only during the RRC reconfiguration period,
      wherein when the configuration indicates to drop CSI during the RRC reconfiguration period, the second CSI is not transmitted to the eNB during the RRC reconfiguration period; and
   after the RRC reconfiguration period:
      configuring third CSI comprising a third CQI index, which is selected on the second CQI table; and
      transmitting the third CSI comprising the third CQI index by using the first PUCCH resource to the eNB.

2. The method of claim 1,
   wherein the first CQI table is a table mapping a CQI index into one of quadrature phase-shift keying (QPSK), 16 quadrature amplitude modulation (QAM) or 64 QAM,
   wherein the second CQI table is a table mapping a CQI index into one of QPSK, 16 QAM, 64 QAM or 256 QAM, and wherein the CQI index for the first CQI table and the CQI index for the second CQI table are configured with same bits.

3. The method of claim 2, wherein each of CQI indices 2-4 for the first CQI table is used for QPSK, and each of CQI indices 2-4 for the second CQI table is used for 256 QAM.

4. An apparatus for reporting channel state information (CSI) including a channel quality indicator (CQI), the apparatus comprising:
   a radio frequency (RF) unit; and
   a processor, operatively coupled to the RF unit, that:
   controls the RF unit to receive a reference signal on a downlink channel from an evolved NodeB (eNB),
   controls the RF unit to receive an indication to use a first CQI table from the eNB,
   configures first CSI comprising a first CQI index, which is selected on the first CQI table corresponding to a channel state based on the received reference signal,
   controls the RF unit to transmit the first CSI comprising the first CQI index by using a first physical uplink control channel (PUCCH) resource to the eNB,
   controls the RF unit to receive an indication to use a second CQI table via a radio resource control (RRC) connection reconfiguration message from the eNB,
   controls the RF unit to receive a configuration indicating whether to transmit or drop CSI during an RRC reconfiguration period which is initiated by receiving the RRC connection reconfiguration message from the eNB,
   when the configuration indicates to transmit CSI during the RRC reconfiguration period, during the RRC reconfiguration period:
   configures second CSI comprising a second CQI index, which is only selected from common entries of the first CQI table and the second CQI table, and
   controls the RF unit to transmit the second CSI comprising the second CQI index by using a second PUCCH resource to the eNB, wherein the second PUCCH resource is an additional different PUCCH resource than the first PUCCH resource and is used only during the RRC reconfiguration period,
   wherein when the configuration indicates to drop CSI during the RRC reconfiguration period, the second CSI is not transmitted to the eNB during the RRC reconfiguration period; and
after the RRC reconfiguration period:
   configures third CSI comprising a third CQI index, which is selected on the second CQI table, and
   controls the RF unit to transmit the third CSI comprising the third CQI index by using the first PUCCH resource to the eNB.

5. The apparatus of claim 4,
wherein the first CQI table is a table mapping a CQI index into one of quadrature phase-shift keying (QPSK), 16 quadrature amplitude modulation (QAM) or 64 QAM,
wherein the second CQI table is a table mapping a CQI index into one of QPSK, 16 QAM, 64 QAM or 256 QAM, and
wherein the CQI index for the first CQI table and the CQI index for the second CQI table are configured with same bits.

6. The apparatus of claim 5, wherein each of CQI indices 2-4 for the first CQI table is used for QPSK, and each of CQI indices 2-4 for the second CQI table is used for 256 QAM.

* * * * *